(12) United States Patent
Begando et al.

(10) Patent No.: US 11,997,108 B1
(45) Date of Patent: May 28, 2024

(54) SYSTEMS AND METHODS FOR PROVIDING CONSENSUS SOURCED VERIFICATION

(71) Applicant: Professional Credentials Exchange, LLC, Tampa, FL (US)

(72) Inventors: Anthony Begando, Tampa, FL (US); Matthew M. Sylvestre, Norfolk, MA (US)

(73) Assignee: Professional Credentials Exchange LLC, Tampa, FL (US)

( * ) Notice: Subject to any disclaimer, the term of this patent is extended or adjusted under 35 U.S.C. 154(b) by 298 days.

(21) Appl. No.: 17/686,771

(22) Filed: Mar. 4, 2022

Related U.S. Application Data

(60) Provisional application No. 63/157,421, filed on Mar. 5, 2021, provisional application No. 63/157,429, filed on Mar. 5, 2021, provisional application No. 63/157,444, filed on Mar. 5, 2021.

(51) Int. Cl.
  *H04L 9/40* (2022.01)
  *G06Q 20/40* (2012.01)
  *H04L 9/32* (2006.01)

(52) U.S. Cl.
  CPC ......... *H04L 63/126* (2013.01); *G06Q 20/401* (2013.01); *H04L 9/3239* (2013.01)

(58) Field of Classification Search
  None
  See application file for complete search history.

(56) References Cited

U.S. PATENT DOCUMENTS

| | | | | |
|---|---|---|---|---|
| 7,159,116 B2* | 1/2007 | Moskowitz | ........... | H04L 9/3297 380/231 |
| 7,644,045 B2* | 1/2010 | Skubic | ..................... | G07C 9/38 705/64 |
| 9,026,474 B2* | 5/2015 | Piersol | .................. | G06K 15/02 705/50 |
| 10,282,762 B2* | 5/2019 | Manning | ............ | G06Q 30/0275 |
| 10,339,525 B2* | 7/2019 | Bogaard | ................ | G06Q 30/06 |

(Continued)

FOREIGN PATENT DOCUMENTS

| | | |
|---|---|---|
| CN | 110995521 A | 4/2020 |
| WO | 2007032766 A1 | 3/2007 |

*Primary Examiner* — Backhean Tiv
(74) *Attorney, Agent, or Firm* — Patterson Intellectual Property Law PC

(57) ABSTRACT

A host system and method are disclosed for conducting verified credential transactions and in certain embodiments generating Consensus Scores for facilitating the same. Via a first user interface, credentials are received from seller devices, wherein the credentials are stored with component data being mapped into various searchable data fields. Via a second user interface, queries are received from buyer devices wherein each query comprises specified values for one or more of the searchable data fields. The system determines which stored credentials match the specified values from the query, resolves each matching credential against a template identifying required data fields, cryptographically hashes the respective component data for each matching credential and more particularly for the required data fields thereof, determines any matching credentials having equivalent hash structures, and generates, substantially in real time with respect to the query, a message to the buyer comprising the matching credentials having equivalent hash structures.

18 Claims, 7 Drawing Sheets

(56) References Cited

U.S. PATENT DOCUMENTS

| | | | |
|---|---|---|---|
| 10,459,990 B1 | 10/2019 | Li et al. | |
| 10,521,780 B1 * | 12/2019 | Hopkins, III | G06Q 20/12 |
| 10,686,799 B2 * | 6/2020 | Kelly | H04L 63/12 |
| 10,740,844 B2 * | 8/2020 | Stradling | H04L 63/105 |
| 11,165,582 B2 * | 11/2021 | Boneh | H04L 9/3297 |
| 11,205,162 B2 * | 12/2021 | Hearn | H04L 9/3239 |
| 11,250,493 B2 * | 2/2022 | Isaacson | G06Q 20/3674 |
| 11,308,448 B1 | 4/2022 | Knas et al. | |
| 11,308,486 B2 * | 4/2022 | Wright | H04L 9/3073 |
| 11,341,555 B2 * | 5/2022 | Ketchel, III | G06Q 30/0613 |
| 11,354,437 B2 * | 6/2022 | Pacella | H04L 9/3218 |
| 11,373,152 B2 * | 6/2022 | Wright | G06F 16/27 |
| 11,449,476 B2 * | 9/2022 | Oberhofer | H04L 9/50 |
| 11,625,694 B2 * | 4/2023 | Wright | H04L 9/0861 |
| | | | 705/71 |
| 2008/0140577 A1 * | 6/2008 | Rahman | G06Q 30/0601 |
| | | | 705/26.1 |
| 2013/0018659 A1 | 1/2013 | Chi | |
| 2019/0205877 A1 * | 7/2019 | Zhuang | G06Q 20/3825 |
| 2020/0090188 A1 * | 3/2020 | Wince | H04L 9/3247 |
| 2020/0272619 A1 * | 8/2020 | Alferov | H04L 9/3297 |

\* cited by examiner

SYSTEMS AND METHODS FOR PROVIDING CONSENSUS SOURCED VERIFICATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of priority with respect to U.S. Provisional Patent Application Nos. 63/157,421, 63/157,429, and 63/157,444, each of which was filed Mar. 5, 2021, and each which is hereby incorporated by reference in its entirety.

BACKGROUND

The present disclosure relates generally to systems and methods for verifying user credentials. In a particular example, the present disclosure relates to providing consensus sourced verification of credentials in the context of a centralized credentials exchange platform.

In the field of information verification, numerous problems exist with being able to quickly and/or efficiently evaluate accuracy of information. For example, with regards to credential verification, it can be time-consuming and inefficient to verify one or more credentials by direct communication with a credentialing authority. This can be caused, for example, by delays in communications or processing associated with the credentialing authority. What is needed is a way to timely and correctly perform verification of one or more credential.

BRIEF SUMMARY

Embodiments consistent with the present disclosure may include systems and methods for providing consensus sourced verification for one or more credentials.

As one particular example, a consensus score for a given verified credential may be derived as follows. One or more (or each, in various embodiments) verified credentials received from exchange member(s) may be cast against an Extensible Stylesheet Language Transformations (XSLT) template that contains a data field level map. The data field level map contained in the XSLT may indicate which data field(s) will be subject to a consensus scoring algorithm executed by the system. The subject data fields may vary by credential type in various embodiments. The mapped data fields may be normalized (e.g., by having escape characters removed) and cryptographically hashed together (e.g., using an industry-standard hashing algorithm such as SHA512) and indexed. When a prospective buyer analyst searches for and evaluates a given verified credential, the hashes of similar verified credentials may be evaluated and those that match may be tallied into a consensus score. The consensus score may for example be presented to the buyer analyst such that they can use it in determining whether to trust/license the verified credential for their use.

Establishing whether verifications from two or more organizations are materially alike to the point that they can be considered equivalent may be included as a function of the host system. Such features may preferably be provided in near real-time such that a credentialing analyst can advantageously evaluate which verified credential they would prefer to purchase during an interactive user session.

In an embodiment of a method as disclosed herein for conducting verified credential transactions, credentials may be received, at a host system and via a first user interface, for potential transaction from a plurality of seller user devices, wherein the credentials are stored with component data being mapped into a plurality of searchable data fields. Further received, at the host system and via a second user interface, is a query from a buyer user device wherein the query comprises specified values for one or more of the searchable data fields. The exemplary method continues by determining one or more of the stored credentials matching the specified values from the query, and resolving each of the determined one or more matching credentials against a template identifying one or more of the plurality of searchable data fields as required for consensus scoring. For each of the determined one or more matching credentials, the exemplary method continues by cryptographically hashing the respective component data for the identified one or more of the plurality of searchable data fields, determining whether any two or more of the determined one or more matching credentials have equivalent hash structures, and generating, substantially in real time with respect to the query from the buyer user device, a message to an associated buyer via the second interface comprising the any two or more of the determined one or more matching credentials having the equivalent hash structures.

In one exemplary aspect according to the above-referenced embodiment, a method as disclosed herein may further comprise executing a transaction between the buyer and a corresponding seller with respect to a selected one of the any two or more of the determined one or more matching credentials having the equivalent hash structures, said selection being received via the second interface.

In another exemplary aspect according to the above-referenced embodiment, the template may be associated with the buyer. The template may for example comprise a Ricardian contract, wherein the method comprises excluding any one or more of the determined one or more matching credentials based on specified requirements in the template.

In another exemplary aspect according to the above-referenced embodiment and optional aspects thereof, received credentials via the first user interface may be resolved against a first template associated with the host system prior to the being stored with component data being mapped into a plurality of searchable data fields, wherein the each of the determined one or more matching credentials may be resolved against a second template associated with the buyer for identifying one or more of the plurality of searchable data fields as required for consensus scoring.

In another exemplary aspect, only those received credentials via the user interface satisfying minimum requirements associated with the first template are stored in the host system for potential transaction.

In another exemplary aspect according to the above-referenced embodiment, the message may comprise each of the determined one or more matching credentials and a consensus score further identifying any of the determined one or more matching credentials having equivalent hash structures.

In an alternative exemplary aspect, the message may comprise only the any two or more of the determined one or more matching credentials having equivalent hash structures.

In another exemplary aspect according to the above-referenced embodiment, each of the determined one or more matching credentials may be associated with a single service provider.

In another embodiment, a host system as disclosed herein may be provided for conducting verified credential transactions, and comprises a first user interface configured to receive credentials for potential transactions from a plurality of seller user devices, wherein the credentials are stored with component data being mapped into a plurality of searchable data fields, and a second user interface configured to receive a query from a buyer user device, wherein the query comprises specified values for one or more of the searchable data fields. One or more processors are further provided and configured to direct the performance of operations or steps in accordance with the above-referenced method embodiment and any of the optional aspects therefor.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
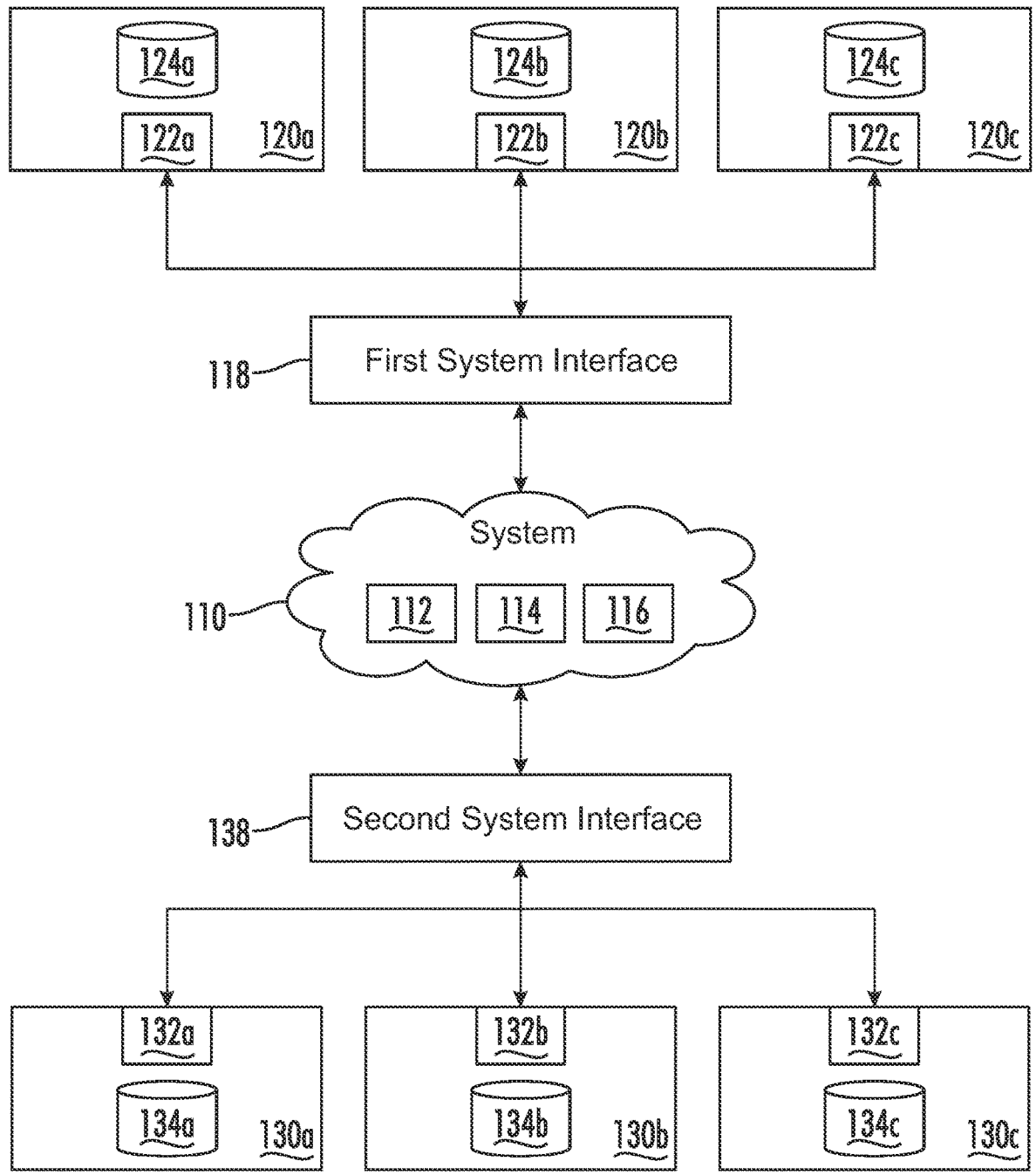
FIG. 1 is a partial block diagram representing an exemplary embodiment of a host system according to aspects of the present disclosure.

While the making and using of various embodiments consistent with the present disclosure are discussed in detail below, it should be appreciated that the present disclosure provides many applicable inventive concepts that can be embodied in a wide variety of specific contexts. The specific embodiments discussed herein are merely illustrative of specific ways to make and use aspects of the disclosure and do not delimit the scope of the present disclosure.

Referring generally to FIGS. 1-7, various exemplary apparatuses and associated methods according to the present disclosure are described in detail. Where the various figures may describe embodiments sharing various common elements and features with other embodiments, similar elements and features are given the same reference numerals and redundant description thereof may be omitted below.

FIG. 1 illustrates a partial block diagram of an exemplary embodiment of a host system 110 and associated network infrastructure according to aspects of the present disclosure.

The system 110 as shown includes a first user interface 118 by which various computing devices such as for example user devices 120a, 120b, 120c associated with participants may access the system, wherein participants in this context may refer to individuals and/or organizations that are providing, selling, or otherwise offering credentials and accordingly professional services via an exchange operated or otherwise administered via the host system 110. The system 110 as shown further includes a second user interface 138 by which various computing devices such as for example user devices 130a, 130b, 130c associated with buyers may access the system, wherein buyers in this context may refer to individuals and/or organizations that are seeking to purchase, acquire, or otherwise obtain credentials and accordingly professional services via the exchange operated or otherwise administered via the host system 110. The aforementioned components may be connected or otherwise functionally linked via a communications network which in various embodiments may include, in whole or in part, the Internet, a public network, a private network, or any other communications medium capable of conveying electronic communications.

In various exemplary embodiments, any or all of the computing devices 120, 130 may be implemented as at least one of a server computer, a server device, a desktop computer, a laptop computer, a smart phone, or any other electronic device capable of executing instructions. A processor (such as a microprocessor) of the computing devices 120, 130 may be a generic hardware processor, a special-purpose hardware processor, or a combination thereof. In embodiments having a generic hardware processor (e.g., as a central processing unit (CPU) available from manufacturers such as Intel and/or AMD), the generic hardware processor may be configured to be converted to a special-purpose processor by means of being programmed to execute and/or by executing a particular algorithm in the manner discussed herein for providing a specific operation or result.

Communication between a communication module 122 (e.g., as illustrated as 122a, 122b, . . . , 122n in FIG. 1) of a computing device 120 (e.g., as illustrated as 120a, 120b, . . . , 120n in FIG. 1) and the host system 110 may be configured to be performed by wired interface, wireless interface, or a combination thereof, without departing from the spirit and the scope of the present disclosure. In one exemplary operation, the computing device 120 is configured to store one or more sets of instructions in a storage 124 (e.g., as illustrated as storage 124a, 124b, . . . , 124n in FIG. 1) coupled thereto or otherwise capable of being communicatively coupled to the computing device 120. The one or more sets of instructions may be configured to be executed by a hardware and/or software processor of the computing device 120 to perform one or more operations corresponding to the one or more sets of instructions.

Likewise, communication between a communication module 132 (e.g., as illustrated as 132a, 132b, . . . , 132n in FIG. 1) of a computing device 130 (e.g., as illustrated as 130a, 130b, . . . , 130n in FIG. 1) and the host system 110 may be configured to be performed by wired interface, wireless interface, or a combination thereof, without departing from the spirit and the scope of the present disclosure. In one exemplary operation, the computing device 130 is configured to store one or more sets of instructions in a storage 134 (e.g., as illustrated as storage 134a, 134b, 134n in FIG. 1) coupled thereto or otherwise capable of being communicatively coupled to the computing device 130. The one or more sets of instructions may be configured to be executed by a hardware and/or software processor of the computing device 130 to perform one or more operations corresponding to the one or more sets of instructions.

The host system 110 may be configured to store sets of information and/or metadata usable by the system 110 to perform or assist in performing one or more operations or functionality described herein. The system 110 may be configured in various embodiments to operate remotely and may be configured to obtain or otherwise operate upon one or more instructions stored physically remote from each of the computing devices 120, 130 (e.g., via client-server communications and/or cloud-based computing). One or more computing devices may be implemented to provide all or a portion of the functionality described herein with reference to the host system 110 without departing from the spirit and scope of the present disclosure. One or more computing devices of the host system 110 may be configured to store at least one set of credential information accessible to and/or useable by another one or more computing devices of the host system 110 to perform further operations described herein or portions thereof.

Figure 2:
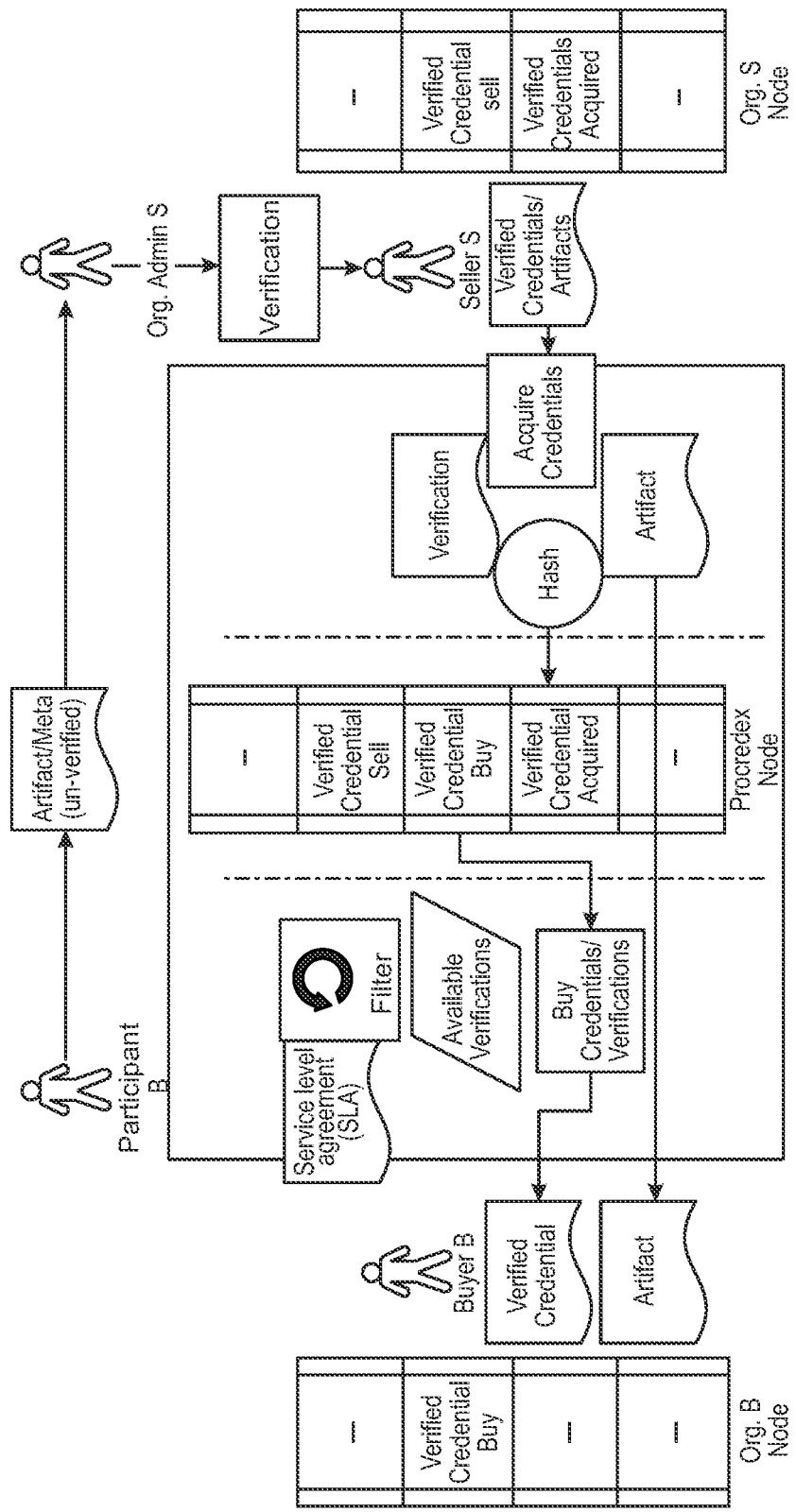
FIG. 2 is a partial block diagram representing an exemplary use case according to aspects of the present disclosure.

FIG. 2 illustrates an exemplary functional system diagram according to aspects of the present disclosure. The system may interact or otherwise facilitate interactions with one or more of a buyer B, a seller S, and/or a participant communicatively coupleable with a host computing node (e.g., the system 110, either in whole or in part). The buyer B may include or be associated with a user device 130 in various embodiments. At least one Verified Credential Buy as represented may be associated with at least one set of verified credentials and optionally one or more set of artifact information, where at least a portion of artifact information may be associated with the verified credential information (for example as associated with at least a portion of raw participant credential set(s) information, such as supportive documents and/or information).

A participant may communicate at least one artifact and/or metadata information which is unverified to an organizational administrator associated with a seller S. The organizational administrator may perform at least one verification operation associated with the information received from the participant and may provide the verification information, the information received from the participant, and/or any other information to the seller S. The seller S may be associated with one or more computing device(s) 120, which may be used to store, either in whole or in part, at least one set of information and/or metadata which may be, for example, associated with the artifact and/or metadata provided by the participant and/or the verification information provided by the organizational admin. Information provided and/or stored by the seller S may include credential information in various embodiments.

The system 110 may be configured to acquire one or more sets of information, such as credentials, from the seller S, optionally along with one or more sets of artifact information and/or metadata. The system may include identifying and/or extracting at least a portion of credential information into one or more sets of verification information and/or one or more sets of artifact information. The system may perform a hashing operation on at least a portion of the one or more sets of verification information and/or the one or more sets of artifact information. The one or more sets of verification information, the one or more sets of artifact information, and/or one or more associated hash value may be provided to a host computing node (e.g., operating as a server previously described herein). The host computing node may be configured to receive and/or store a verified credential (e.g., as expressed as verification information, artifact information, and an associated hash value).

The host computing node of the system 110 may be configured to perform at least one verified credential buy operation associated with at least one verified credential. A buyer B may have an associated Service Level Agreement (SLA) associated with one or more verified credentials or information associated therewith. The buyer SLA may be used to selectively filter one or more sets of verified credentials (e.g., as stored by or otherwise known or accessible to the host computing node). One or more sets of available verifications may be identified, and the buyer B may execute at least one purchase of verified credentials. Through the at least one of the verified credential, the buyer B may be provided with the verified credential and may be provided with at least one artifact associated with the at least one verified credential.

Figure 3:
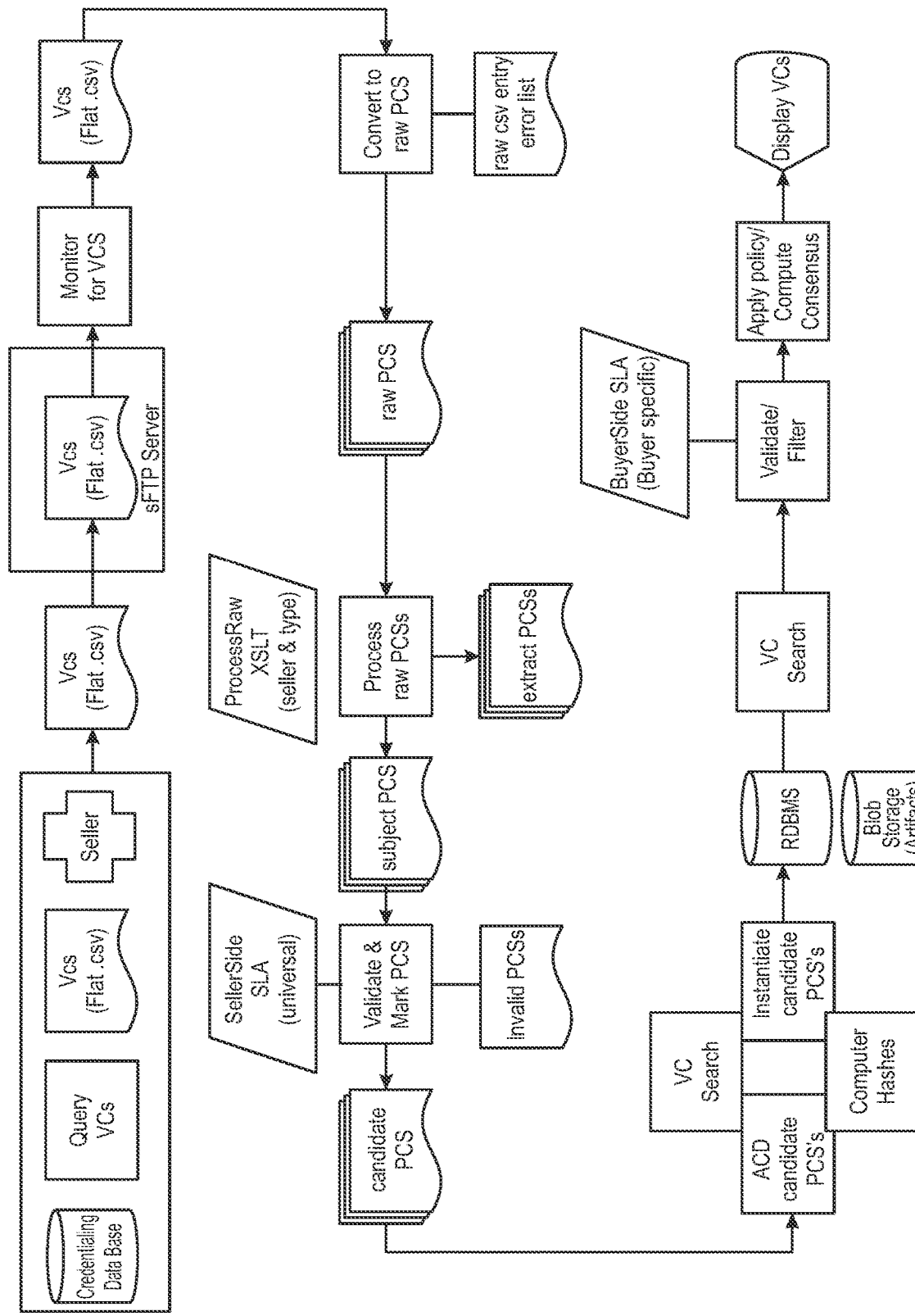
FIG. 3 is a partial block diagram representing an exemplary embodiment of a method according to aspects of the present disclosure.
Figure 4:
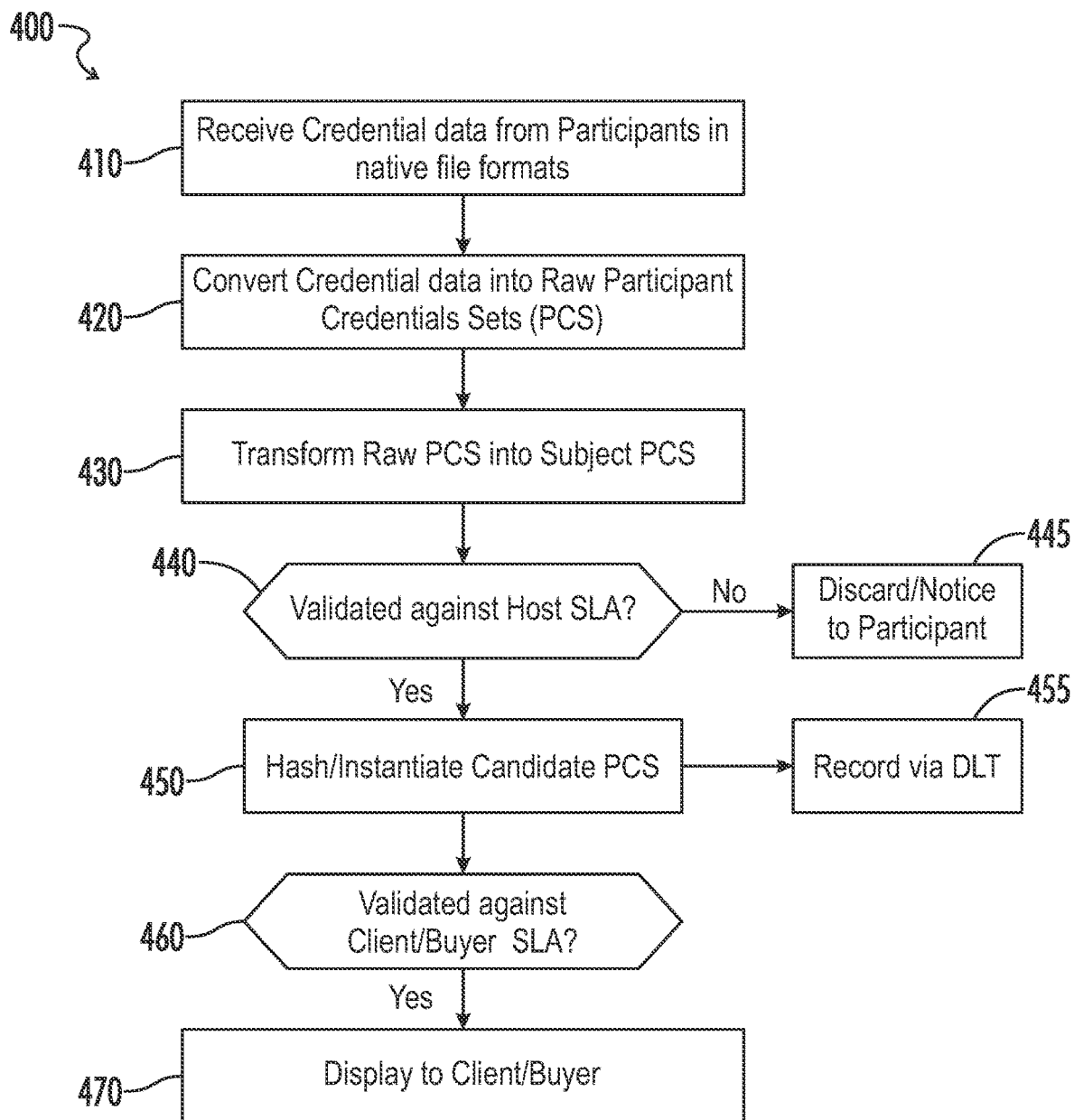
FIG. 4 is a flowchart representing an exemplary embodiment of another method according to aspects of the present disclosure.

FIGS. 3 and 4 illustrate exemplary embodiments of a data ingestion process (e.g., 400 in FIG. 4) according to aspects of the present disclosure. The exemplary data ingestion process may include functionality enabling sellers S of verified credentials who are members of the exchange platform associated with the host system 110 being periodically capable of extracting one or more verified credentials (e.g., newly acquired verified credentials or information associated with such) from their credentialing systems and provide them in various native file formats to the exchange platform typically through secure file transfer protocol (sFTP) and/or application programming interface (API) (e.g., step 410 in FIG. 4).

The seller S system may include a credentialing database, a query verified credentials (VCs) module, and one or more VCs, for example as stored as a flat .csv file (although any format may be used without departing from the spirit and scope of the present disclosure). The seller S may transmit at least one set of VCs (e.g., as one or more flat .csv files) to the sFTP server. The exchange platform may be configured to monitor for the presence of new seller data on a continuous basis. Additionally. or alternatively, the host system 110 may be configured to periodically check for new seller data, and/or may check when requested by a user and/or at a random time (e.g., during a low utilization or off-hours time).

When new data is obtained, a program module may be used to convert it to a series of raw data files (e.g., one or more XML files) which are programmatically structured into the form of raw participant credentials sets (PCS) (e.g., step 420 in FIG. 4). This may take place through the application of a functional programming language such as LINQ. Any structural data errors may be off-lined and optionally reviewed by a technical analyst.

One simulated and abbreviated example of a raw PCS document according to various aspects of the present disclosure is provided as Exhibit 1 to U.S. Application No. 63/157,429, as incorporated by reference hereto.

An Extensible Markup Language Template (XSLT) may be applied to the raw PCS to further process them into a form acceptable to the exchange platform. One simulated and abbreviated example of an XSLT document according to various aspects of the present disclosure is provided as Exhibit 2 to U.S. Application No. 63/157,429, as incorporated by reference hereto.

One or more data elements may be mapped into one or more "Aliases", that is, into one or more industry-standard (or other standardized) terms (e.g. "emp.ID" becomes "EmployeeID").

In various embodiments, both data and time formats may be standardized.

One or more supportive documents and/or information, known as "artifacts" may be related to one or more PCS. Header information and/or metadata needed for further processing may be applied. The processed raw PCS may now be considered a subject PCS (e.g., step 430 in FIG. 4), one simulated and abbreviated example of which is provided as Exhibit 3 to U.S. Application No. 63/157,429, as incorporated by reference hereto, and which may be validated against a "Seller Side" or a "Universal" Service Level Agreement (SLA) (e.g., 440 in FIG. 4). One simulated and abbreviated example of a Seller Side SLA document according to various aspects of the present disclosure is provided as Exhibit 4 to U.S. Application No. 63/157,429, as incorporated by reference hereto. This SLA may be used to enforce one or more minimum current exchange platform requirements and may be used to discard any subject PCS that does not conform and/or provide notice thereof to the credentialing entity and/or seller S (e.g., 445 in FIG. 4).

Subject PCS that pass the "seller side" SLA validation may be considered "candidate" PCS. One simulated and abbreviated example of a Candidate PCS document according to various aspects of the present disclosure is provided as Exhibit 5 to U.S. Application No. 63/157,429, as incorporated by reference hereto. Candidate PCS may be broken into individual verified credential PCS records (as necessary, if more than one verified credential is resident within the candidate PCS file). One or more individual candidate PCS may be hashed using one or more hashing algorithms (e.g., using an industry-standard hashing algorithm such as SHA-512), which provide an element of tamper resistance to the PCS while resident in the exchange platform and are used for performant in-process comparison to similar verified credentials that are already stored within the exchange platform (e.g., step 450 in FIG. 4).

An ACD process (Add Change Delete) may be run against the subject PCS to determine if the new data should replace/change existing exchange data, should be treated as new, and/or should be discarded as a duplicate. The candidate PCS may be instantiated into the underlying persistence layer as an object in both a transactional relational database for performance and a post-relational document database for ease of lexical search and analysis. The candidate PCS may remain in the persisted state until some future point where it is searched for and considered for purchase by an exchange member.

An authorized exchange member may search for verified credentials using professional and or demographic identifiers. All verified credentials in the exchange platform that meet the search criteria may be cached. Cached verified credentials may be processed against the "client-side" Service Level Agreement (wherein the SLA may identify the client's requirements and preferences) (e.g., step 460 in FIG. 4). One simulated and abbreviated example of a Client-Side SLA document according to various aspects of the present disclosure is provided as Exhibit 6 to U.S. Application No. 63/157,429, as incorporated by reference hereto. Cached verified credentials that conform to the SLA are presented to the authorized exchange member for review, for example automatically or selectively in accordance with exchange settings (e.g., step 470 in FIG. 4). The authorized exchange member may then review, evaluate, purchase, or discard the verified credentials as they see fit based on their needs.

As described herein, an exemplary data ingestion process may accordingly in at least some embodiments be used to take one or more sets of raw verified credential data from one or more prospective sellers S and to process it into a form that prospective buyers B may consume according to the specific (and programmatically enforced) requirements of their organization.

Figure 5:
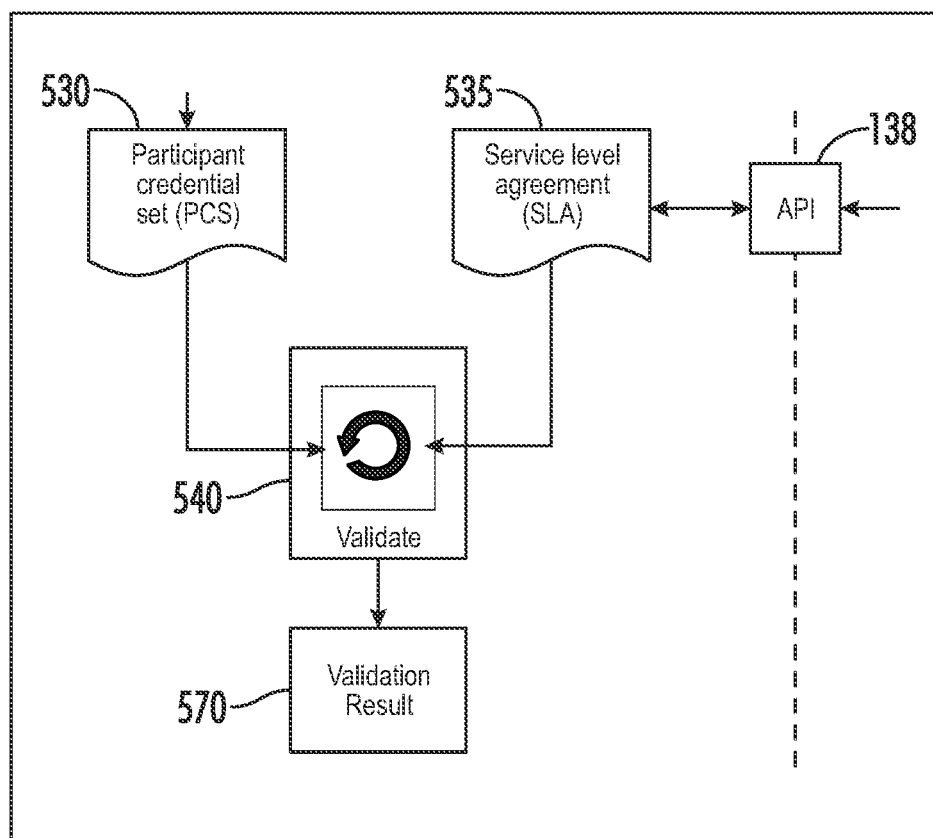
FIG. 5 is a partial block diagram representing an exemplary validation engine in context according to aspects of the present disclosure.

Referring next to FIG. 5, with further reference for illustration to previously disclosed steps, various embodiments of a host system 110 as disclosed herein may comprise or otherwise utilize/execute a validation engine 540. A validation engine according to aspects of the present disclosure may include one or more participant credential sets (PCS) 530, Service Level Agreements (SLAs) 535, and/or validation results 570 derived from the validation engine 540.

As used herein, the one or more PCS 530 may include at least one structured and/or hierarchical set of data which represents a full set or subset of the professional credentials (e.g. medical license) a participant possess. As used herein, a "participant" may for example be a professional or other person with professional and/or personal history that may be evaluated against one or more employment criteria in an exemplary embodiment. A PCS may be implemented in an Extensible Markup Language (XML) or other format, optionally in a single form which is both human- and computer-readable. A PCS may also be readily and/or flexibly rendered to various device screens through the application of an Extensible Stylesheet Language Transformation (XSLT). One simulated and abbreviated example of a PCS in XML form according to various aspects of the present disclosure is provided as Exhibit 1 to U.S. Application No. 63/157,444, as incorporated by reference hereto.

As used herein, a Service Level Agreement (SLA) 535 may for example be implemented in the style of a Ricardian Contract. The SLA may be a structured and/or hierarchical set of one or more requirements, constraints, constants, and/or logic, which, taken together, may detail the policy a given client organization applies to the evaluation of a candidate participant, i.e., a participant who is being evaluated. The SLA may include an exhaustive set of requirements or be targeted to singular evaluation criteria (e.g., one specific element of candidate participant background, one credential) in an exemplary embodiment. An SLA may for example be realized using XML and may optionally be both human- and computer-readable. An SLA may also be readily and/or flexibly rendered to various device screens through the application of one or more XSLTs.

As used herein, a validation result 570 may be a structured set of data reflecting an outcome of one or more validation of a PCS 530 against at least one SLA 535. This result may optionally be rendered in human-readable form and/or acted upon by computer code further downstream by an Application Program Interface (API) 138.

The above-referenced exemplary details regarding the mechanics of a validation engine 540 as realized within the host system 110 are not meant to be exhaustive but rather examples of use cases and functionality possible through and/or in conjunction with the validation engine. The validation engine may be harnessed through performing a plurality of operations. Periodically, a human and/or machine-readable SLA 535 depicting at least one organizational policy and operational preferences of a client organization may be compiled (for example, by a business analyst at a user device 130 via the second user interface 138 in an exemplary embodiment). The SLA may be realized as an XML document (e.g., a proprietary XML document) that can optionally be both rendered in readable prose and processed by the validation engine. One simulated and abbreviated example of such a Service Level Agreement in XML form according to various aspects of the present disclosure is provided as Exhibit 2 to U.S. Application No. 63/157,444, as incorporated by reference hereto. Ultimately, the policy and preferences may be compiled as a cascading series of rule references, configuration options, and/or default values.

On an ongoing basis through traditional data means of data exchange (e.g. sFTP, API, etc. via the host system 110), participant data may be received from its source and selectively transformed into a structured document (e.g., a structured XML document) optionally via application of an XSLT template resulting in a PCS. The PCS may include one or more XML nodes representing the components of verified credentials, their respective elements, and/or one or more related attributes and/or values.

As PCS data 530 enters the exchange platform (e.g., from one or more computing devices 120) it may be cast against a universal SLA (e.g., as an SLA depicting the absolute minimum requirements for a PCS to be offered on the exchange platform).

On an ad hoc basis, one or more client analyst administrators may enter the exchange platform to review verified credentials available for sale. These analyst administrators may then only be offered verified credentials that meet the requirements detailed in the client SLA 535. This process of obtaining verified credentials may be performed in-session, in real-time.

The validation engine 540 architecture may include one or more of: (1) one or more proprietary class definitions representing an SLA, a PCS, one or more credentials, and/or one or more verifications; (2) one or more class methods configured to act upon at least one PCS and/or SLA; (3) one or more Serialization Functions configured to transform the XML based on PCS and SLA into one or more instantiated classes; (4) one or more codified generic rules processing functions which can be arranged and executed in any sequence based at least in part upon SLA requirements; (5) one or more external facts loadable into in session constants for a given period of processing (e.g., UTC Date/Time), and/or a post-relational data base document store for caching PCS and SLA renderings available to process.

The validation engine 540 may be provided in an object-oriented language such as, e.g., Microsoft .net C# or one or more other modern object-oriented languages and/or frameworks. Implementations consistent with the present disclosure may support a mutable class-based paradigm with functional constructs. An exemplary embodiment of the validation engine 540 compute may include a stream read operation, an interpretation operation, a computation operation, and/or a recursion operation. For the stream read operation the validation engine 540 may stream read the XML-based PCS 530 and SLA 535 into one or more hierarchical class structures which can be iterated. For the interpretation operation, using map functions, the validation engine 540 may step through the SLA 535 procedurally, dynamically calling generic static methods arranged as rules and configuration values. One or more computation operation may include at least one method applied to the data in the PCS representational data structure to ultimately determine a Boolean outcome (e.g., valid or invalid). At least one recursion operation may be used to navigate through the entire SLA/PCS streaming results to a validation result 570 such as in the form of a structured XML document which may be referred to as a Validation Out XML file. One simulated and abbreviated example of a Validation Out file in XML form according to various aspects of the present disclosure is provided as Exhibit 3 to U.S. Application No. 63/157,444, as incorporated by reference hereto.

One or more pragmatic actions may be taken by the validation engine's host application as appropriate via internal Application Programming Interface (API) 138.

In an embodiment, to persist the outcomes of the validation engine 540 at a point in time such that the validation result 570 is immutable, tamper-proof, and independently verifiable, the validation engine may preferably integrate with a distributed ledger. One example of such Distributed Ledger Technologies (DLT) that could be leveraged may include R3 Corda Distributed Ledger Technology, without limitation.

The DLT integration with the validation engine 540 may for example be implemented as follows. At a given point in time, the participant credential set (PCS) XML representation is hashed using commonly available hashing algorithm(s) (e.g., SHA-256). At a given point in time, the Service Level Agreement (SLA) XML that is applied to the PCS is also hashed using commonly available hashing algorithms (e.g., SHA 256). The host system 110 may then submit to the DLT, along with attendant metadata (e.g., type of hashing algorithm applied), the full plain text XML representation of the PCS and its hash, and the full plain text representation of the SLA and its hash. The DLT then validates, stores, and propagates the PCS, SLA, and metadata into the nodes that comprise the DLT based on its specific protocols and processes. Upon successful (or unsuccessful) propagation of the PCS, SLA, and metadata into the DLT, a response is generated and returned to the validation engine 540, marking the completion of transactions.

Application of the above process may allow all parties involved in transactions supported by the validation engine 540 to independently verify and therefore trust the outcome of any/all given transactions. Parties do not have to rely on the validation engine 540 or any other aspect of the exchange platform associated with the host system 110 but may rely on the distributed ledger itself.

Figure 6:
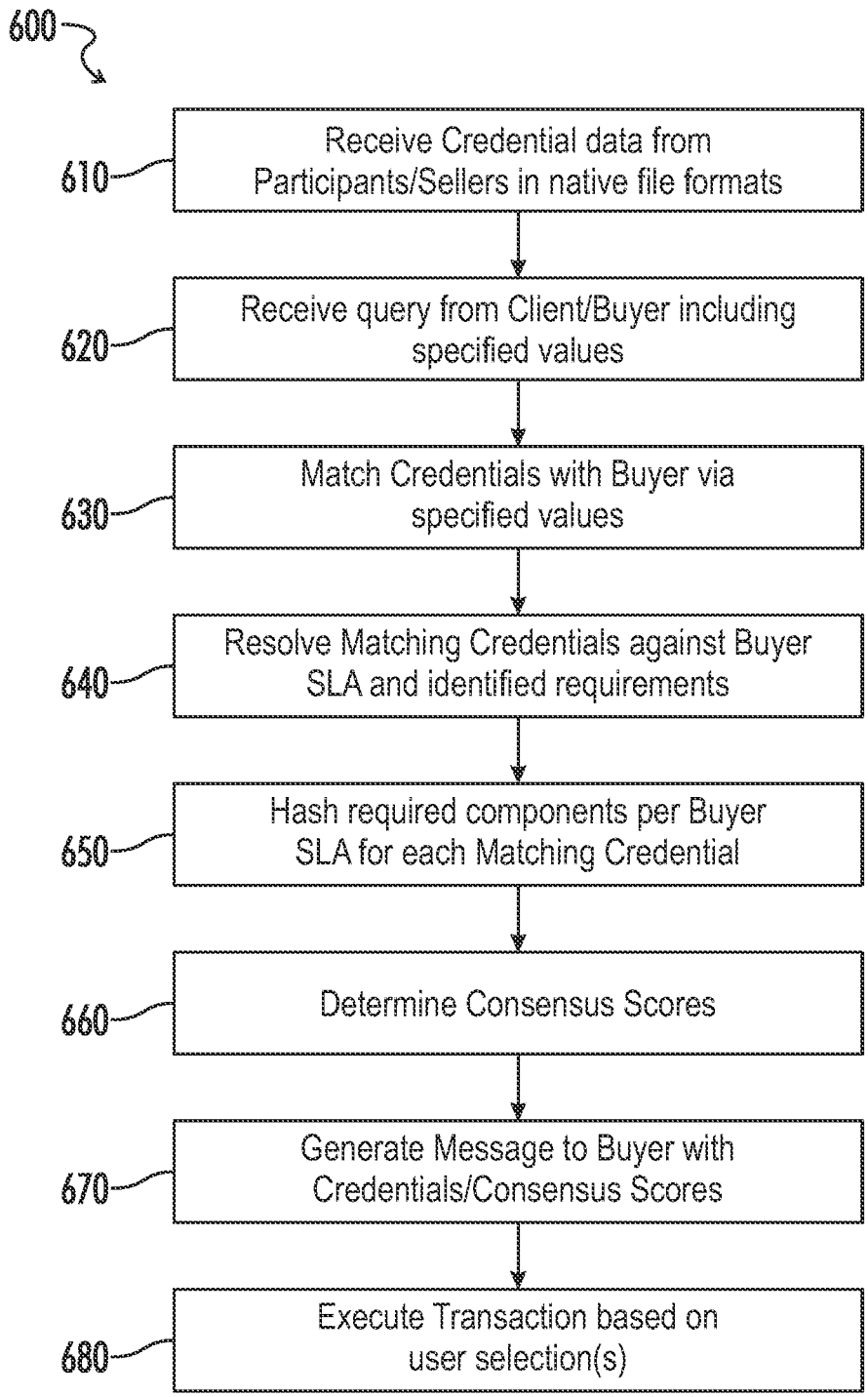
FIG. 6 is a flowchart representing an exemplary embodiment of another method according to aspects of the present disclosure.
Figure 7:
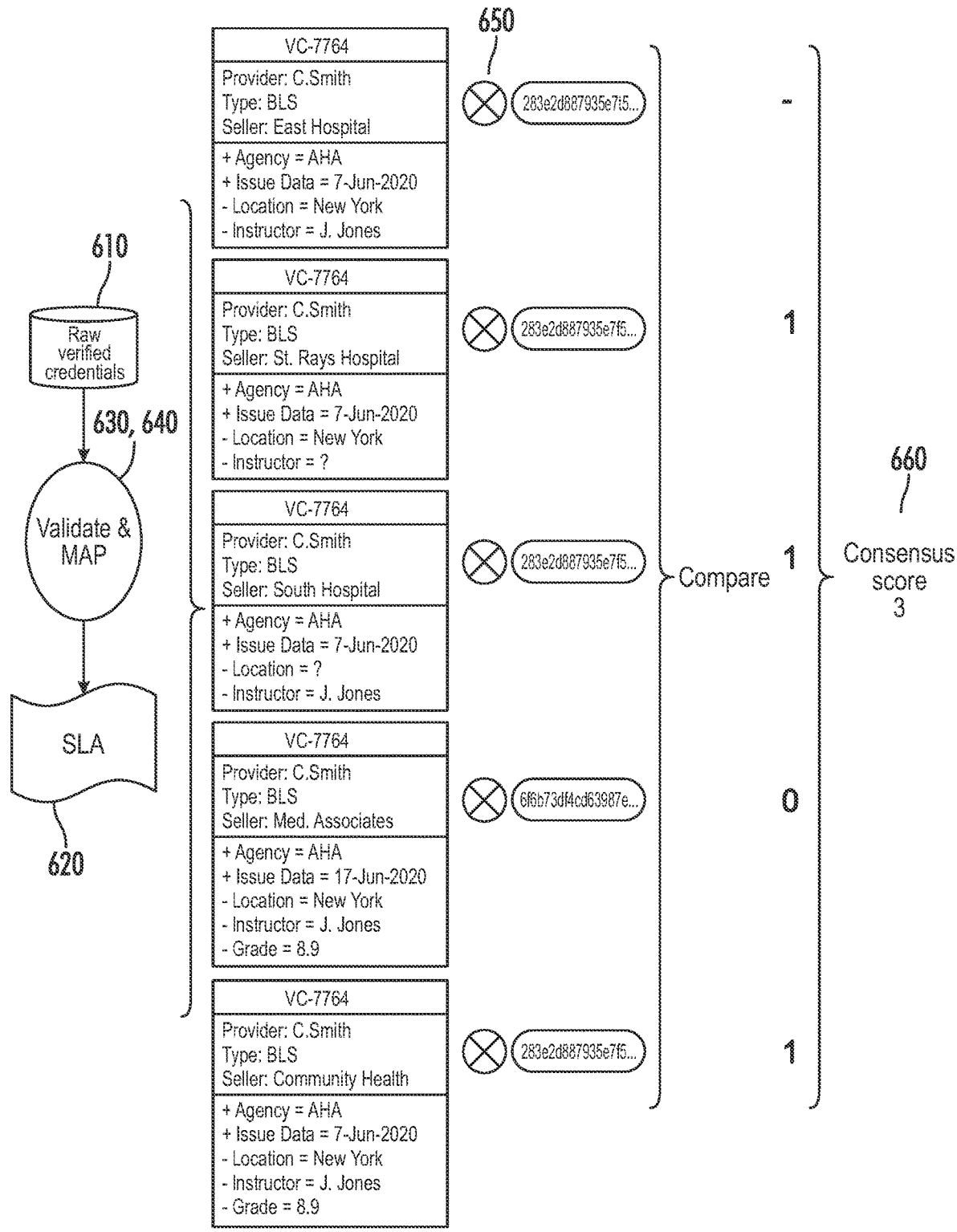
FIG. 7 is a partial block diagram representing an exemplary consensus verification score computation according to aspects of the present disclosure.

Referring next to FIGS. 6 and 7, an embodiment of a host system 110 as disclosed herein may further providing consensus sourced verification for one or more credentials. As used herein, the term "credential" may broadly and unless otherwise specifically otherwise delimited refer to any set of information or metadata associated with an individual, group, entity, and/or any other element. Credentials may include, for example, an academic or professional credential, a certification, an attribute, a location, or any other information or metadata associated with an individual, group, entity, and/or any other element.

Consistent with the present disclosure, two or more credential verifications might not be absolutely identical in various implementations. For example, there may be slight variations in the way each organization (e.g., a "seller" using the host system/exchange) collects, records, and/or verifies their credential data or portion thereof. Therefore, consensus sourced verification may be concerned with confirming that credential verifications are materially alike so as to be included in a "consensus score" in various exemplary embodiments.

A "consensus score" may for example be a computed value that indicates how many verified credentials reside within the host platform in real-time and are materially alike or equivalent to a verified credential currently under review.

One particular example of a method 600 for conducting verified credential transactions including generation of a consensus score for a given verified credential may be described as follows, with reference to FIG. 6.

Credentials may be received (step 610) in the exchange platform associated with the host system 110 via a first user interface 118, for potential transaction from an exchange member user device 120, wherein the credentials are stored with component data being mapped into a plurality of searchable data fields. The exchange platform associated with the host system 110 further receives (step 620) via the second user interface 138 a query from a buyer user device 130 wherein the query comprises specified values for one or more of the searchable data fields. The exchange platform then determines one or more of the stored credentials matching the specified values from the query (step 630), and resolves each of the determined one or more matching credentials against a template (e.g., SLA associated with the buyer) identifying one or more of the plurality of searchable data fields as required for consensus scoring (step 640).

For example, one or more (or each, in various embodiments) verified credentials received from exchange member(s) may be cast against an Extensible Stylesheet Language Transformations (XSLT) template that contains a data field level map. The data field level map contained in the XSLT may indicate which data field(s) will be subject to a consensus scoring algorithm executed by the system. The subject data fields may vary by credential type in various embodiments. The mapped data fields may be normalized (e.g., by having escape characters removed) and cryptographically hashed together (e.g., using an industry-standard hashing algorithm such as SHA512) and indexed (step 650). When a prospective buyer analyst searches for and evaluates a given verified credential, the hashes of similar verified credentials may be evaluated and those that match may be tallied into a consensus score (step 660). The consensus score may for example be presented to the buyer analyst (step 670) such that they can use it in determining whether to trust/license the verified credential for their use. Based on a selection of one or more verified credentials by the buyer analyst, for example via the second user interface 138, the method 600 may further include executing a transaction (step 680) between the buyer and corresponding seller(s).

FIG. 7 illustrates an exemplary use case according to aspects of the present disclosure, and more particularly the consensus scoring aspect as described above with respect to FIG. 6. As illustrated for example on the left side of FIG. 7, a host system 110 consistent with the present disclosure may include a database of verified credentials (see step 610) and a Service Level Agreement (SLA) (see step 620) used to validate and map (see steps 630, 640) one or more credentials.

The example illustrated by FIG. 7 depicts a typical use case of a consensus scoring process in which a credentialing buyer analyst (e.g., using a buyer user device 130) from the fictitious West Hospital searches the exchange platform associated with the host system 110 for a verified Basic Life Support (BLS) credential for a healthcare provider named 'C. Smith". The host system 110 may identify that a total of seven verified BLS credentials for C. Smith have been submitted for sale on the exchange by various exchange members (e.g., as stored in whole or in part from one or more computing devices 120 via the first user interface 118). The buyer analyst from West Hospital may sign into the exchange platform and may enter a query for C. Smith with all the attendant search criteria (e.g., professional identification or National Provider Identifier (NPI)). A search of the consensus score may be computed, in whole or in part, by identifying the verified credentials which meet the buyer analyst's query (e.g., seven results as illustrated by FIG. 7) are cast against West Hospital's SLA (e.g., as implemented as a Ricardian Contract which enumerates all of West Hospitals specific requirements for what it considers a minimally acceptable verified credential for its use) by the host system 110.

The validation engine, for example in accordance with an embodiment as described above, may in the case of FIG. 7 yield five verified credentials any one of which the buyer analyst may choose to purchase. Thus, the seven initial verified credentials of FIG. 2 are filtered down to five for consensus scoring and ultimate review by the buyer analyst. Component data from credentials depicted in FIG. 7 are mapped such that fields containing required data defined by the West Hospital's SLA are denoted as such. In various embodiments there may be additional supportive data that is contained variably in each verified credential, but without this data being necessarily used for consensus scoring.

In one example, the required data from each of the verified credentials may be normalized and hashed using a generally available hashing algorithm (e.g., SHA512 in this example, although one or more other algorithms may be used instead or in combination).

The resulting hashes may then be compared for equivalence. In the present example, identical hashes result in a value of one (1) which may be summed into the consensus score for the set of verified credentials (see step 660). In the example illustrated by FIG. 7, there are three of the five verified credentials that are materially equivalent, thereby yielding a consensus score of three (3).

The buyer analyst may be presented with the consensus score via the second user interface 138, which may be or comprise a portal such as a webpage or other interface provided by the host system 110. In an embodiment, a message may be generated directing the buyer analyst to those verified credentials which comprise the score. Of course, the buyer analyst may wish to choose the current verified credential, one of the other verified credentials that comprise the consensus score, or none at all.

It should be noted that although the depiction of consensus sourced verification and its related scoring process centers on healthcare in the example provided by FIG. 7, and indeed elsewhere in the present disclosure, it should be understood that the systems and processes described herein may be universally applicable to any and all professions/verticals requiring verification of prospective employee, employee, agent, or organization professional credentials. Further applications may include, but are not limited to, nuclear engineering, public safety, and aviation. Consistent with the present disclosure, consensus sourced verification and/or one or more operations associated therewith may be capable of use based upon any set of information or portion thereof and should not be limited to only credentials.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Unless otherwise specifically noted, the various illustrative logical blocks, modules, and algorithm steps described in connection with embodiments of a host system 110 as disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Unless otherwise specifically noted, the various illustrative logical blocks and modules described in connection with the embodiments of a host system 110 disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Unless otherwise specifically noted, the steps of a method or algorithm described in connection with embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A method for conducting verified credential transactions, the method comprising:
   receiving, at a host system and via a first user interface, credentials for potential transaction from a plurality of seller user devices, wherein the credentials are stored with component data being mapped into a plurality of searchable data fields;
   receiving, at the host system and via a second user interface, a query from a buyer user device wherein the query comprises specified values for one or more of the searchable data fields;
   determining one or more of the stored credentials matching the specified values from the query;
   resolving each of the determined one or more matching credentials against a template identifying one or more of the plurality of searchable data fields as required for consensus scoring;
   for each of the determined one or more matching credentials, cryptographically hashing the respective component data for the identified one or more of the plurality of searchable data fields;
   if the one or more matching credentials comprise at least two matching credentials, determining whether any two or more of the matching credentials have equivalent hash structures; and
   generating, substantially in real time with respect to the query from the buyer user device, a message to an associated buyer via the second interface comprising the any two or more of the determined one or more matching credentials having the equivalent hash structures.

2. The method of claim 1, further comprising executing a transaction between the buyer and a corresponding seller with respect to a selected one of the any two or more of the determined one or more matching credentials having the equivalent hash structures, said selection being received via the second interface.

3. The method of claim 1, wherein the template is associated with the buyer.

4. The method of claim 3, wherein the template comprises a Ricardian contract, the method comprising excluding any one or more of the determined one or more matching credentials based on specified requirements in the template.

5. The method of claim 1, wherein received credentials via the first user interface are resolved against a first template associated with the host system prior to the being stored with component data being mapped into a plurality of searchable data fields, and wherein the each of the determined one or more matching credentials are resolved against a second template associated with the buyer for identifying one or more of the plurality of searchable data fields as required for consensus scoring.

6. The method of claim 5, wherein only those received credentials via the user interface satisfying minimum requirements associated with the first template are stored in the host system for potential transaction.

7. The method of claim 1, wherein the message comprises each of the determined one or more matching credentials and a consensus score further identifying any of the determined one or more matching credentials having equivalent hash structures.

8. The method of claim 1, wherein the message comprises only the any two or more of the determined one or more matching credentials having equivalent hash structures.

9. The method of claim 1, wherein each of the determined one or more matching credentials are associated with a single service provider.

10. A host system for conducting verified credential transactions, the host system comprising:
   a first user interface configured to receive credentials for potential transactions from a plurality of seller user devices, wherein the credentials are stored with component data being mapped into a plurality of searchable data fields;
   a second user interface configured to receive a query from a buyer user device, wherein the query comprises specified values for one or more of the searchable data fields; and
   one or more processors configured to:
      determine one or more of the stored credentials matching the specified values from the query;
      resolve each of the determined one or more matching credentials against a template identifying one or more of the plurality of searchable data fields as required for consensus scoring;
      for each of the determined one or more matching credentials, cryptographically hash the respective component data for the identified one or more of the plurality of searchable data fields;
      if the one or more matching credentials comprise at least two matching credentials, determine whether any two or more of the matching credentials have equivalent hash structures; and
      generate, substantially in real time with respect to the query from the buyer user device, a message to an associated buyer via the second interface comprising the any two or more of the determined one or more matching credentials having the equivalent hash structures.

11. The host system of claim 10, wherein the one or more processors are further configured to execute a transaction between the buyer and a corresponding seller with respect to a selected one of the any two or more of the determined one or more matching credentials having the equivalent hash structures, said selection being received via the second interface.

12. The host system of claim 10, wherein the template is associated with the buyer.

13. The host system of claim 12, wherein the template comprises a Ricardian contract, the one or more processors further configured to exclude any one or more of the determined one or more matching credentials based on specified requirements in the template.

14. The host system of claim 10, wherein received credentials via the first user interface are resolved against a first template associated with the host system prior to the being stored with component data being mapped into a plurality of searchable data fields, and wherein the each of the determined one or more matching credentials are resolved against a second template associated with the buyer for identifying one or more of the plurality of searchable data fields as required for consensus scoring.

15. The host system of claim 14, wherein only those received credentials via the user interface satisfying minimum requirements associated with the first template are stored in the host system for potential transaction.

16. The host system of claim 10, wherein the message comprises each of the determined one or more matching credentials and a consensus score further identifying any of the determined one or more matching credentials having equivalent hash structures.

17. The host system of claim 10, wherein the message comprises only the any two or more of the determined one or more matching credentials having equivalent hash structures.

18. The host system of claim 10, wherein each of the determined one or more matching credentials are associated with a single service provider.

\* \* \* \* \*